United States Patent Office 3,637,749
Patented Jan. 25, 1972

3,637,749
α-CYANO-1,3-DITHIOLANE - Δ²,ᵅ - THIONOACETIC ACID DERIVATIVES AND PROCESS FOR PREPARING THE SAME
Brian Russ O'Connor, Wilmington, Del., assignor to E. I. du Pont de Nemours and Company, Wilmington, Del.
No Drawing. Filed Aug. 13, 1968, Ser. No. 752,131
Int. Cl. C07d 71/00, 73/00
U.S. Cl. 260—327 M       3 Claims

ABSTRACT OF THE DISCLOSURE

Halocyanoethylene reacts with alkylene trithiocarbonates to form α-cyano-1,3-dithiolane-Δ²,ᵅ-thionacetyl halides and α-cyano-1,3-dithiane-Δ²,ᵅ-thionacetyl halides. Further products can be made by interchange of the halogen or by reacting the halogen with an active hydrogen compound such as an alcohol, thiol or amine. The products are useful as dyestuffs for acetate, acrylic and polyamide fibers.

FIELD OF THE INVENTION

This invention is in the field of novel heterocyclic dyestuffs and especially relates to new 1,3-dithiolanes and to a new process for preparing the 1,3-dithiolanes.

BACKGROUND OF THE INVENTION

It is known that certain alkylene trithiocarbonates react with dimethyl acetylenedicarboxylate to form substituted 1,3-dithiolane-2-thiones and the olefin corresponding to the alkylene portion of the alkylene trithiocarbonate (D. B. J. Easton and D. Leaver, Chem. Communications, 1965, 585). For example:

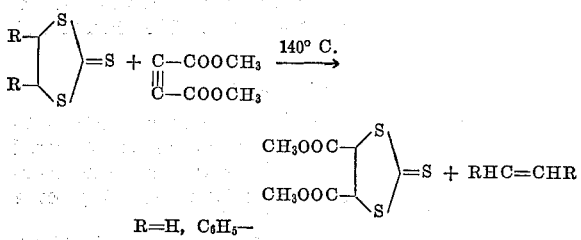

It has now been discovered that a facile reaction occurs between alkylene trithiocarbonates and halocyanoacetylene to yield surprising and useful products.

SUMMARY OF THE INVENTION

The general formula of the products of this invention is:

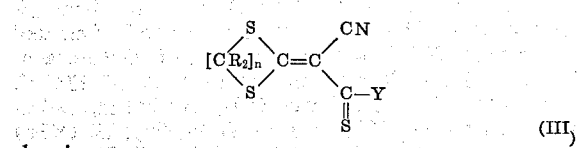

wherein:

$n$ is 2–3

Y is halogen, —OR', —SR' or —NRR' and R and R' are hydrocarbyl of 1 to 8 carbon atoms. When more than one R and/or R' group is present in the molecule the R' groups can be alike or different. In addition R can be hydrogen.

The halo compounds (except fluorine) can be prepared by reacting a halocyanoacetylene having the formula

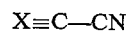

with an alkylene trithiocarbonate having the formula

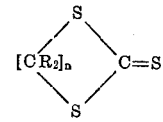

in an inert aprotic organic solvent at a temperature of 0 to 80° C., to obtain

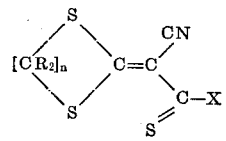

wherein X is chlorine, bromine or iodine and $n$ and R are defined as above. The halogen compound is thus optionally reacted with alcohols, thiols, amines or Group I metal halides to obtain other compounds within the scope of this invention.

DETAILED DESCRIPTION OF THE INVENTION

The alkylene trithiocarbonates used in the practice of this invention are 1,3-dithiolane-2-thiones and 1,3-dithian-2-thiones having only hydrocarbyl substituents on the 4,5 or 4,5,6 carbons, respectively. These are described in D. S. Breslow and H. Skolnik, "Multisulfur and Sulfur-Oxygen 5- and 6-membered Heterocycles," Interscience, New York, Part 1, pp. 530–546, 1960. The preferred reactants are the 1,3-dithiolane-2-thiones as defined above. 4-aryl-1,3-dithiolane-2-thiones are preferred as giving the deepest color for dyes. The halocyanoacetylenes in which halogen is chlorine, bromine or iodine which form the other reactant in the initial step are known compounds.

The novel reaction of halocyanoacetylenes with alkylene trithiocarbonates to form α-cyano-1,3-dithiolane-Δ²,ᵅ-thionacetyl halide is carried out by stirring the reactants in a suitable inert aprotic solvent at 0° to 80° C. for 4 to 24 hours or longer. Preferably, this reaction is allowed to procede at from ambient temperatures to slightly elevated temperatures, e.g., at from about 20–50° C.

Suitable inert aprotic solvents include benzene, toluene, xylenes, tetrahydrofuran, carbon disulfide, chloroform, methylene chloride, acetonitrile, acetone, methyl ethyl ketone and chlorofluorohydrocarbons that boil in a convenient range, e.g., 45–100° C.

Stirring or shaking the reaction mixture, while not essential, is desirable in order to effect intimate contact of the reactants and thus increase the speed of reaction.

The reaction requires one mole each of the halocyanoacetylene and alkylene trithiocarbonate and it is therefore preferred to employ the reactants in an approximate 1:1 mole ratio. However, it is possible to react the compounds in any ratio, the amount of product being limited by the reactant in deficiency.

The additional products of this invention in which X=, —OR, —SR, and —NRR' are prepared by a simple metathetical reaction of the α-cyano-1,3-dithiolane-$\Delta^{2,\alpha}$-thionoacetyl halide. The higher or somewhat hindered alcohols, thiols, or amines may react slowly and it may be desired to warm the reaction mixture. It usually suffices to warm to steam bath temperatures, i.e., ca. 80° C.; preferably, the reaction is effected at 20–50° C. In these reactions an excess of the alcohol, thiol or amine is conveniently used as solvent though other solvents may be used.

Exchange of the halogen in α-cyano-1,3-dithiolane-$\Delta^{2,\alpha}$-thionoacetyl halides is conveniently carried out as in Example 3 by refluxing with the salt of another halide. This exchange is particularly useful to exchange of the halogen in the easily prepared α-cyano-1,3-dithiolane-$\Delta^{2,\alpha}$-thionoacetyl chloride or bromide with a metallic fluoride to make the otherwise unavailable fluoride compound.

UTILITY

Compounds of this invention are useful in dyeing cellulose triacetate, nylon and, surprisingly, acrylic fibers, as represented by "Zephran" and "Creslan." These dyes are particularly adaptable to the well-known method of disperse dyeing. A convenient procedure is as follows:

A dye bath is prepared by dissolving 1 part of dye in the minimum amount (generally 5–15 parts) of "good" solvent such as acetone, glycol, acetic acid, methyl ethyl ketone, and dimethylformamide. The crude dye solution is poured into a vessel containing 400 parts of rapidly stirred water. Alternatively, it is convenient, and often superior results are obtained, to pour the dye solution into a dilute aqueous solution of 1 part of a sulfonated lignin dispersant ("Marasperse," Marathon Corporation), in 400 parts of water. Under these conditions the dye bath is usually colorless and in no event is the bath deep colored. Skeins of fiber or swatches of fabric are immersed in the dye bath and the mixture heated on a steam bath for about 1 hour. The skeins or swatches are stirred occasionally to minimize uneven dyeing. The dyed product is removed from the bath, washed with soap and water, rinsed thoroughly, and dried.

This invention is further illustrated by the following specific examples which should not, however, be construed as fully delineating the scope thereof. In these examples, parts are given by weight unless otherwise specified.

EXAMPLE 1

To a stirred solution of 6.5 g. (0.05 mole) of bromocyanoacetylene in 100 ml. of xylene was added in portions 6.8 g. (0.05 mole) of ethylene trithiocarbonate. The mixture was stirred for 24 hours at 25–35° C. and the product collected as 12.0 g. of a red-violet crystalline solid, M.P. 126–140° C. (dec.).

*Analysis.*—Calcd. for $C_6H_4BrNS_3$ (percent): C, 27.07; H, 152; N, 5.27; S, 36.13; Br, 30.02. Found (percent): C, 27.47, 27.25; H, 1.94, 1.63; N, 5.27, 5.27.

Recrystallization of 1.0 g. of the material from 25 ml. of hot benzene yielded 0.5 g. of α-cyano-1,3-dithiolane-$\Delta^{2,\alpha}$-thioacetyl bromide brilliant red-violet needles, M.P. 126° C. (dec.); UV max. ($CH_3CN$), 242 mμ (ε 20,000), 266 mμ (6400), 294 mμ (3300), 330 mμ (3860), 400 mμ (19,200), and 520 mμ (130); IR (KBr) 2200 cm.$^{-1}$ (m.), 1355 cm.$^{-1}$ (s.), and 1325 cm.$^{-1}$ (s.); NMR ($CH_2Cl_2$) δ 3.67 (s.).

*Analysis.*—Found (percent): C, 27.16; H, 1.43; N, 5.27; S, 35.51; Br, 30.10. M.W. Calcd.: 266. Found: 284 (cryoscopic in benzene).

EXAMPLE 2

A solution of 1.3 g. (0.01 mole) of bromocyanoacetylene and 2.1 g. (0.01 mole) of 4-phenyl-1,3-dithiolane-2-thione in 25 ml. of benzene was stirred at 25° C. for 24 hours and 2.2 g. of nearly pure α-cyano-4-phenyl-1,3-dithiolane-$\Delta^{2,\alpha}$-thioacetyl bromide was collected as a red-violet solid, M.P. 125–126° C. (dec.). An analytical sample, obtained by crystallizing 1.9 g. of the product from 60 ml. of 50:50 hexane:benzene, had M.P. 125–126° C. (dec.); UV max. ($CH_3CN$) 244 mμ (ε 24,700), 265 mμ sh., 295 mμ (ε 3750), 334 mμ (ε 3860), 408 mμ (ε 20,150, and 522 mμ (ε 126); IR (KBr) 2205 cm.$^{-1}$ (m.), 1390 cm.$^{-1}$ (s.), and 1308 cm.$^{-1}$ (s.); NMR ($CDCl_3$) δ 8.5 (s.,5), δ 5.38 (t.,1), δ 3.81–4.04 (m.,2).

*Analysis.*—Calcd. for $C_{12}H_8NS_3Br$ (percent): C, 42.10; H, 2.36; N, 4.09; Br, 23.35; S, 28.11. Found (percent): C, 42.16; H, 2.21; N, 3.85; Br, 23.32; S, 28.20. M.W. Calcd.: 342. Found: 347 (Fp. in benzene).

EXAMPLE 3

A slurry of 2.6 g. (0.01 mole) of α-cyano-1,3-dithiolane-$\Delta^{2,\alpha}$-thioacetyl bromide and 6.0 g. (0.10 mole) of potassium fluoride in 50 ml. of acetonitrile was refluxed under nitrogen for 15 hours. The insoluble solids were filtered and the filtrate concentrated to yield 1.58 g. of crude product, M.P. 85–101° C. The crude product was purified by sublimation at 90° C. (0.1 mm.) to yield α-cyano-1,3-dithiolane-$\Delta^{2,\alpha}$-thioacetyl fluoride, a bright yellow-orange solid, M.P. 105.5–107.5° C. UV max. ($CH_3CN$) 219 mμ (ε 9300), 241 mμ (ε 11,600), 260 mμ sh., 317 mμ (ε 5550), and 383 mμ (ε 18,200); IR (KBr) 2205 cm.$^{-1}$ (m.), 1775 cm.$^{-1}$ (w.), 1420 cm.$^{-1}$ (s.), and 1120 cm.$^{-1}$ (s.); $H^1$ NMR ($CD_3CN$) δ 3.87 (s.); $F^{19}$ NMR ($CH_3CN$) —57.7 p.p.m. from F–11 (s.).

*Analysis.*—Calcd. for $C_6H_4NS_3F$ (percent): C, 35.10; H, 1.97; N, 6.82; F, 9.25. Found (percent): C, 35.16, H, 1.84; N, 7.02; F. 9.35.

EXAMPLE 4

A slurry of 1.0 g. (0.0038 mole) of α-cyano-1,3-dithiolane-$\Delta^{2,\alpha}$-thioacetyl bromide in 40 ml. of ethyl alcohol was stirred at 25° C. for 24 hours. Eethyl α-cyano-1,3-dithiolane-$\Delta^{2,\alpha}$-thionoacetate was collected as 0.65 g. of a yellow solid, M.P. 133–134° C.; UV max. ($CH_3CN$) 246 mμ (ε12,000), 278 mμ (ε 4350), 300 mμ (ε 5400), and 360 mμ (ε 18,400); IR (KBr) 2200 cm.$^{-1}$ (m.) and 1445 cm.$^{-1}$ (s.); NMR ($CDCl_3$) δ 4.62 (q., 2, J=7 Hz), δ 1.49 (t., 3, J=7 Hz.), δ 3.63 (s., 4).

*Analysis.*—Calcd. for $C_8H_9NOS_3$ (percent): C, 41.52; H, 3.93; N, 6.06; S, 41.57. Found (percent): C, 41.42; H, 3.94; N, 6.13; S, 41.88. M.W. calcd: 236. Found 231 (Fp in benzene).

EXAMPLE 5

(A) A slurry of 2.6 g. (0.01 mole) of α-cyano-1,3-dithiolane-$\Delta^{2,\alpha}$-thioacetyl bromide in 75 ml. of methanol was stirred 12 hours at 25° C. Methyl α-cyano-1,3-dithiolane-$\Delta^{2,\alpha}$-thionoacetate was collected as 2.1 g. of a light brown solid, M.P. 133–135° C. (dec.).

*Analysis.*—Calcd. for $C_7H_7NS_3O$ (percent): C, 38.68; H, 3.25; N, 6.45. Found (percent): C, 38.38; H, 3.15; N, 6.46.

(B) A slurry of the compound in hot water dyed acetate, "Arnel" cellulose triacetate fiber, "Creslan" acrylic fiber, nylon, and "Zephran" acrylic fiber yellow.

EXAMPLE 6

A slurry of 1.0 g. (0.0029 mole) of α-cyano-4-phenyl-1,3-dithiolane-$\Delta^{2,\alpha}$-thioacetyl bromide in 30 ml. of ethanol was stirred at 25° C. overnight and 0.6 g. of ethyl α-cyano-4-phenyl-1,3-dithiolane-$\Delta^{2,\alpha}$-thioacetate, M.P. 133–134° C. (dec.) was collected; UV max. ($CH_3CN$) 247 mμ (ε 16,-300), 305 mμ (ε 5500), 363 mμ (ε 19,000); IR (KBr) 2202 cm.$^{-1}$ (m.), 1455 cm.$^{-1}$ (s.), NMR ($CDCl_3$) δ 8.42 (m., 5), δ 5.18 (t., 1, J=8.5 Hz.); δ 4.57 (q., 2, J=7 Hz.); δ 3.71 (d., 2, J=8.5 Hz.), δ 1.41 (t., 3, J=7 Hz.).

*Analysis.*—Calcd. for $C_{14}H_{13}NOS_3$ (percent): C, 54.66; H, 4.26; N, 4.56; S, 31.28. Found (percent): C, 54.82; H, 3.94; N, 4.51; S, 31.64.

EXAMPLE 7

(A) To a solution of 5.3 g. (0.02 mole) of α-cyano-1,3-dithiolane-Δ$^{2,α}$-thioacetyl bromide in 100 ml. of tetrahydrofuran was added 5.5 g. (0.061 mole) of aniline. The mixture was stirred for several hours at 25° C. then the aniline hydrobromide collected and the filtrate concentrated to yield 5.5 g. of crude N-phenyl α-cyano-1,3-dithiolane-Δ$^{2,α}$-thioacetamide, M.P. 153–160° C. Two crystallizations from benzene yielded bright yellow crystals, M.P. 172.5–174.5° C.; UV max. (CH$_3$CN) 243 mμ (ε 17,250), 292 mμ (ε 8,400), 342 mμ (17,400), and 435 mμ sh. (ε 550); IR (KBr) 3,200 cm.$^{-1}$ (m.), 2,198 cm.$^{-1}$ (m.), 1,595 cm.$^{-1}$ (w.), 1,520 cm.$^{-1}$ (m.), 1,470 cm.$^{-1}$ (s.), and 1,455 cm.$^{-1}$ (s.); NMR (CDCl$_3$) δ 7.47 (m., 5), δ 3.51 (s., 1).

*Analysis.*—Calcd. for C$_{12}$H$_{10}$N$_2$S$_3$ (percent): C, 51.77; H, 3.63; N, 10.05. Found (percent): C, 51.93; H, 3.47; N, 10.07.

(B) A slurry of the compound in hot water with 2 drops of acetic acid added dyed acetate, "Arnel" cellulose triacetate fiber, "Creslan" acrylic fiber, nylon, and "Zephran" acrylic fiber yellow.

EXAMPLE 8

(A) Anhydrous methylamine was bubbled through a stirred solution of 5.3 g. (0.02 mole) of α-cyano-1,3-dithiolane-Δ$^{2,α}$-thioacetyl bromide in 125 ml. of tetrahydrofuran until the red color was completely discharged. The insoluble yellow solid which had formed was collected (3.82 g.) and extracted with 40 ml. of distilled water. The water-insoluble product, N-methyl α-cyano-1,3-dithiolane-Δ$^{2,α}$-thioacetamide, was obtained as 1.63 g. of a yellow solid, M.P. 218–220° C. The tetrahydrofuran solution was concentrated and yielded 2.6 g. of a yellow-orange solid, M.P. 198–212° C. An analytical sample (0.62 g., M.P. 219–221° C.) was obtained by crystallizing 1.0 g. of the crude product from 110 ml. of benzene; IR (KBr) 3300 cm.$^{-1}$ (m.), 2200 cm.$^{-1}$ (m.), 1,535 cm.$^{-1}$ (m.), 1480 cm.$^{-1}$ (s.); NMR (CD$_3$SOCD$_3$ λ 8.45 (m., 1), δ 3.72 (s., 4), δ 3.12 (d., 3, J=4.5 Hz.).

*Analysis.*—Calcd. for C$_7$H$_8$N$_2$S$_3$ (percent): C, 38.84; H, 3.73; N, 12.94; S, 44.46. Found (percent): C, 38.76; H, 3.92; N, 12.97; S, 44.54. M.W. calcd.: 216. Found: 209 (Fp in DMSO).

(B) A slurry of the compound in hot water dyed acetate "Arnel" cellulose triacetate fiber, "Creslan" acrylic fiber, nylon, and "Zephran" acrylic fiber yellow.

EXAMPLE 9

To a solution of 5.3 g. (0.02 mole) of α-cyano-1,3-dithiolane-Δ$^{2,α}$-thioacetyl bromide in 100 ml. of tetrahydrofuran was added 4.4 g. (0.06 mole) of diethylamine. After a few hours 2.9 g. of diethylamine hydrobromide was collected and the filtrate concentrated to a yellow-brown oil. Trituration of the oil with ether yielded 4.0 g. of crude N,N-diethyl α-cyano-1,3-dithiolane - Δ$^{2,α}$ - thioacetamide, M.P. 65–69° C. Crystallization of 2 g. from 100 ml. of 1:1 ether-benzene yielded 0.6 g. of an analytical sample, M.P. 66–68° C.; UX max. (CH$_3$CN) 26 mμ (ε 13,800), 305 mμ (ε 14,400), 397 mμ (ε 825); IR (KBr) 2195 cm.$^{-1}$ (w.) and 1515 cm.$^{-1}$ (s.); NMR (CDCl$_3$) δ 3.85 (q., 4, J=7 Hz.), δ 1.30 (t., 6, J=7 Hz.), δ 3.58 (s., 4).

*Analysis*—Calcd. for C$_{10}$H$_{14}$N$_2$S$_3$ (percent): C, 46.47; H, 5.46; N, 10.84; S, 37.22. Found (percent): C, 46.33; H, 5.40; N, 10.91. M.W. Calcd.: 258. Found: 270 (Fp in benzene).

EXAMPLE 10

Anhydrous dimethylamine was bubbled through a stirred solution of 5.3 g. (0.02 mole of α-cyano-1,3-dithiolane-Δ$^{2,α}$-thioacetyl bromide in 175 ml. of tetrahydrofuran until the red color was completely discharged. The dimethylamine hyrobromide was collected (2.35 g.) and the filtrate concentrated under reduced pressure to yield 4.6 g. of crude N,N-dimethyl α-cyano-1,3-dithiolane-Δ$^{2,α}$-thioacetamide. Crystallization of 1.0 g. from 75 ml. of 70:30 benzene-hexane yielded 0.7 g. of bright yellow needles, M.P. 146–148° C.; UV max. (CH$_3$CN) 208 mμ (ε 8250), 260 mμ (ε 12,800), 307 mμ (14,000), and 390 mμ (ε 1150); IR (KBr) 2205 cm.$^{-1}$ (m.), 1530 cm.$^{-1}$ (s.), and 1500 cm.$^{-1}$ (s.); NMR (CH$_2$Cl$_2$) δ 3.59 (s., 4) and δ 3.39 (s., 6).

*Analysis*—Calcd. for C$_8$H$_{10}$N$_2$S$_3$ (percent): C, 41.66; H, 4.37; N, 12.16; S, 41.75. Found (percent): C, 41.51; H, 4.54; N, 12.17; S, 41.81. M.W. Calcd.: 230. Found: 233 (Fp in DMSO).

EXAMPLE 11

(A) A solution of 5.0 g. (0.033 mole) of trimethylenetrithiocarbonate and 4.3 g. (0.033 mole) of bromocyanoacetylene in 80 ml. of benzene was stirred at 25° C., and after a few minutes brilliant crystals of α-cyano-1,3-dithiolane-Δ$^{2,α}$-thionoacetyl bromide appeared. After standing overnight, the crystalline product partly decomposed and was no longer crystalline.

(B) The above synthesis was repeated except for use of additional benzene (100 ml. total) and protection of the reaction mixture by an atmosphere of nitrogen. After 24 hours reaction time, 4.0 g. of dark crystalline α-cyano-1,3-dithiolane-Δ$^{2,α}$-thionoacetyl bromide was collected by filtration and dried in a desiccator.

The following table further exemplifies the preparation of α-cyano-4-, and/or 5-substituted-1,3-dithiolane-Δ$^{2,α}$-thionoacetyl halides. When the alkylene trithiocarbonates of column 1 are reacted, as described in the preceding examples, with the halocyanoacetylene of column 2, the product of column 3 is obtained.

TABLE I

| Alkylene trithiocarbonate | Halocyanoacetylene; XC=CCN, X= | Product |
| --- | --- | --- |
| 4-methyl-1,3-dithiolane-2-thione | Br | α-Cyano-4-methyl-1,3-dithiolane-Δ$^{2α,}$-thionoacetyl bromide. |
| 4,5-dimethyl-1,3-dithiolane-2-thione | —Br | α-Cyano-4,5-dimethyl-1,3-dithiolane-Δ$^{2α,}$-thionoacetyl bromide. |
| 4,4-dimethyl-1,3-dithiolane-2-thione | Cl | α-Cyano-4,4-dimethyl-1,3-dithiolane-Δ$^{2α,}$-thionoacetyl chloride. |
| 4-ethyl-1,3-dithiolane-2-thione | Cl | α-Cyano-4-ethyl-1,3-dithiolane-Δ$^{2α,}$-thionoacetyl chloride. |
| 4-n-butyl-1,3-dithiolane-2-thione | Cl, (Br) | α-Cyano-4-n-butyl-1,3-dithiolane-Δ$^{2α,}$-thionoacetyl chloride (bromide). |
| 4-n-octyl-1,3-dithiolane-2-thione | —Cl, (Br) | α-Cyano-4-n-octyl-1,3-dithiolane-Δ$^{2α,}$-thiloacetyl chloride (bromide). |
| 4-n-hexyl-4-ethyl-1,3-dithiolane-2-thione | —Br | α-Cyano-4-n-hexyl-4-ethyl-1,3-dithiolane-Δ$^{2α,}$-thionoacetyl bromide. |
| 4-p-tolyl-1,3-dithiolane-2-thione | —Br | α-Cyano-4-p-tolyl-1,3-dithiolane-Δ$^{2α,}$-thionoacetyl bromide. |
| 4-(2,4-xylyl)-1,3-dithiolane-2-thione | —Br | α-Cyano-4-(2,4-xylyl)-1,3-dithiolane-Δ$^{2α,}$-thionoacetyl bromide. |
| 4-(2′-ethylphenyl)-1,3-dithiolane-2-thione | —Br | α-Cyano-4-(2′-ethylphenyl)-1,3-dithiolane-Δ$^{2α,}$-thionoacetyl bromide. |
| 4,5-diphenyl-1,3-dithiolane-2-thione | —Cl, (—Br) | α-Cyano-4,5-diphenyl-1,3-dithiolane-Δ$^{2α,}$-thionoacetyl chloride (bromide). |
| 4-methyl-4-phenyl-1,3-dithiolane-2-thione | —Cl, (Br) | α-Cyano-4-methyl-4-phenyl-1,3-dithiolane-Δ$^{2α,}$-thionoacetyl chloride (bromide). |

The following table further exemplifies the preparation of α-cyano-4-, and/or 5-substituted-1,3-dithiolane-Δ$^{2,α}$-thionoacetates, -dithioacetates, and thioacetamides. When the reactant from column 1 is stirred or warmed with the reactant from column 2, the product in column 3 is obtained.

3. Process of making a compound having the formula:

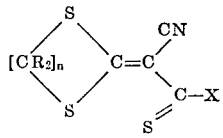

TABLE II

| α-Cyano-4-, and/or 5-substituted 1,3-dithiolane-Δ$^{2,α}$-thionoacetyl halide | | | | | Alcohol, thiol or amine | Product |
|---|---|---|---|---|---|---|
| 4 | 4' | 5 | 5' | Halogen | | |
| CH$_3$ | H | H | H | Br | n-Octyl alcohol | n-Octyl α-cyano-4-methyl-1,3-dithiolane-Δ$^{2,α}$-thionoacetate. |
| CH$_3$ | H | CH$_3$ | H | Br | 1-octanthiol | n-Octyl α-cyano-4,5-dimethyl-1,3-dithiolane-Δ$^{2,α}$-dithioacetate. |
| C$_6$H$_5$ | H | H | H | Br | Phenol | Phenyl α-cyano-4-phenyl-1,3-dithiolane-Δ$^{2,α}$-thionoacetate. |
| C$_6$H$_5$ | H | C$_6$H$_5$ | H | Br | p-Cresol | p-Cresyl α-cyano-4,5-diphenyl-1,3-dithiolane-Δ$^{2,α}$-thionoacetate. |
| CH$_3$pC$_6$H$_4$ | H | H | H | Br | Thiophenol | Phenyl α-cyano-4-p-tolyl-1,3-dithiolane-Δ$^{2,α}$-dithioacetate. |
| CH$_3$ | CH$_3$ | H | H | Br | 2,4-xylenol | 2,4-xylyl α-cyano-4,4-dimethyl-1,3-dithiolane-Δ$^{2,α}$-thionoacetate. |
| CH$_3$ | CH$_3$ | H | H | Br | Ethanethiol | Ethyl α-cyano-4,4-dimethyl-1,3-dithiolane-Δ$^{2,α}$-dithioacetate. |
| C$_6$H$_5$ | H | H | H | Br | N-methylaniline | N-methyl-N-phenyl α-cyano-4-phenyl-1,3-dithiolane-Δ$^{2,α}$-thioacetamide. |
| C$_6$H$_5$ | H | H | H | Br | 2,4-xylidine | N-(2,4)-xylyl α-cyano-4-phenyl-1,3-dithiolane-Δ$^{2,α}$-thioacetamide. |
| C$_6$H$_5$ | H | H | H | Br | Hexylamine | N-n-hexyl α-cyano-4-phenyl-1,3-dithiolane-Δ$^{2,α}$-thioacetamide. |
| C$_4$H$_7$ | H | H | H | Br | Octylamine | N-octyl α-cyano-4-n-butyl-1,3-dithiolane-Δ$^{2,α}$-thioacetamide. |
| C$_6$H$_5$ | H | H | H | Br | β-Phenethyl alcohol | β-Phenethyl α-cyano-4-phenyl-1,3-dithiolane-Δ$^{2,α}$-thionoacetate. |
| C$_6$H$_5$ | H | H | H | Br | Benzyl alcohol | Benzyl α-cyano-4-phenyl-1,3-dithiolane-Δ$^{2,α}$-thionoacetate. |
| C$_6$H$_5$ | H | H | H | Br | Benzyl mercaptan | Benzyl α-cyano-4-phenyl-1,3-dithiolane-Δ$^{2,α}$-dithioacetate. |

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound having the formula

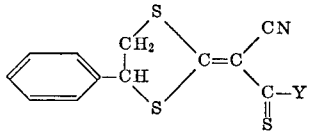

wherein

Y is halogen, —OR', —SR' or NRR'

R' is hydrocarbyl of up to 8 carbon atoms and R is hydrocarbyl of up to 8 carbon atoms or hydrogen, said hydrocarbyl groups being alkyl or aryl groups.

2. A compound having the formula

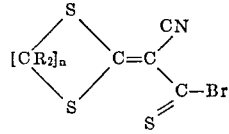

wherein $n$ is 2 or 3, and R is H or a hydrocarbyl of up to 8 carbon atoms, said hydrocarbyl group being alkyl or aryl groups.

in which $n$ is 2 or 3, R is hydrogen or hydrocarbyl of up to 8 carbon atoms, said hydrocarbyl group being an alkyl or an aryl group, and X is chlorine, bromine or iodine, which comprises reacting a compound having the formula

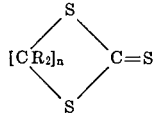

with a halocyanoacetylene having the formula $$X—C\equiv—CN$$

in an inert, aprotic organic solvent at a temperature of 0 to 80° C.

References Cited
UNITED STATES PATENTS 2,493,071    1/1950    Kendall et al. _____ 260—327

OTHER REFERENCES

Gompper et al., C.A. 58; 9067–8 (April 1963).
Mayer et al., C.A. 62: 13140–1 (May 1965).
Lowy et al., Intro. Org. Chem. (New York, 1945), pp. 213–5.

HENRY R. JILES, Primary Examiner

C. M. SHURKO, Assistant Examiner

U.S. Cl. X.R.

8—178 R, 179